(12) United States Patent
Sakata et al.

(10) Patent No.: US 9,327,625 B2
(45) Date of Patent: May 3, 2016

(54) VEHICLE SEAT

(71) Applicant: TOYOTA BOSHOKU KABUSHIKI KAISHA, Aichi-ken (JP)

(72) Inventors: Masaru Sakata, Aichi-ken (JP); Mitsuko Hama, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 86 days.

(21) Appl. No.: 14/105,452

(22) Filed: Dec. 13, 2013

(65) Prior Publication Data
US 2014/0167463 A1    Jun. 19, 2014

(30) Foreign Application Priority Data
Dec. 17, 2012   (JP) .................................. 2012-274332

(51) Int. Cl.
*B60N 2/44* (2006.01)
*B60N 2/02* (2006.01)
*B60N 2/66* (2006.01)

(52) U.S. Cl.
CPC ............ *B60N 2/4415* (2013.01); *B60N 2/0244* (2013.01); *B60N 2/665* (2015.04); *B60N 2002/0268* (2013.01)

(58) Field of Classification Search
CPC .... B60N 2/4415; B60N 2/665; B60N 2/0244; B60N 2002/0268
USPC .............. 297/284.1, 284.6, 217.3; 701/36, 49
See application file for complete search history.

(56) References Cited

U.S. PATENT DOCUMENTS

| | | | |
|---|---|---|---|
| 8,616,654 B2* | 12/2013 | Zenk et al. ............... | 297/452.41 |
| 2005/0225429 A1* | 10/2005 | Burzio .......................... | 340/5.24 |
| 2007/0112492 A1* | 5/2007 | Hyodo et al. ................... | 701/49 |
| 2010/0276973 A1 | 11/2010 | Zenk et al. | |
| 2012/0053794 A1* | 3/2012 | Alcazar et al. .................. | 701/48 |

FOREIGN PATENT DOCUMENTS

| | | |
|---|---|---|
| CN | 102712275 | 10/2012 |
| JP | 55-153959 | 4/1979 |

(Continued)

OTHER PUBLICATIONS

Chinese Office Action for CN application No. 201310683948.7 dated Oct. 21, 2015, along with English-language translation thereof.

(Continued)

*Primary Examiner* — Milton Nelson, Jr.

(74) *Attorney, Agent, or Firm* — Greenblum & Bernstein, P.L.C.

(57) ABSTRACT

A vehicle seat includes: a seat back which has a backrest support surface for a seat occupant that is variable in shape; a plurality of air bags that are located behind a support surface portion of the seat back and change the shape of the support surface upon introduction or discharge of air thereinto or therefrom; and a control device that is configured to control the introduction and discharge of air into and from the air bags. The control device controls the introduction and discharge of air into and from each air bag based on a state of change in the air in each air bag that occurs when the seat occupant sits on the vehicle seat with the air bags in the set state to change the shape of the backrest support surface to a shape that conforms to the seat occupant's unique sitting position.

9 Claims, 4 Drawing Sheets

(56) References Cited

FOREIGN PATENT DOCUMENTS

| JP | 62-178449 | 8/1987 |
| JP | 2009-172145 | 8/2009 |

OTHER PUBLICATIONS

Japanese Office Action for JP App. No. 2012-274332 dated Mar. 3, 2016, along with partial English-language translation thereof.

* cited by examiner

VEHICLE SEAT

INCORPORATION BY REFERENCE

The disclosure of Japanese Patent Application No. 2012-274332 filed on Dec. 17, 2012 including the specification, drawings and abstract is incorporated herein by reference in its entirety.

BACKGROUND OF THE INVENTION

1. Field of the Invention

The present invention relates to a vehicle seat. More specifically, the present invention relates to a vehicle seat which automatically adjusts its shape.

2. Description of Related Art

An attempt has been made to create an appropriate sitting position by adjusting the seat shape based on a result of detection by a detecting device (refer to Japanese Patent Application Publication No. 2009-172145 (JP 2009-172145 A)). It is stated in JP 2009-172145 A that the invention is used to prevent the onset of low back pain and that the erection angle of the pelvis is adjusted to create a comfortable position. It is also stated that pressure sensors that are provided in a seat cushion and a seat back are used to detect the maximum-pressure position to make it possible to adjust the erection angle of the pelvis.

SUMMARY OF THE INVENTION

In JP 2009-172145 A, however, it is mentioned that the erection angle of the pelvis is changed but there is no description of an advantage of a seat that has a seat back, i.e., the viewpoint of supporting the back of the seat occupant properly. When the backrest has an appropriate support surface shape, the seat occupant can be seated in an appropriate position and the back of the seat occupant can be supported properly enough to reduce the stress on the seat occupant. However, no one can find a way to support the back of a seat occupant properly without knowing that different people have different backs. There are various differences among our backs. For example, some have a soft back while others have a hard back. Some have a rounded back while others have a straight back. Because of such differences, different people have different ranges in which they can move their backs comfortably. On the other hand, to support the seat occupant properly is to make the seat occupant change his or her posture almost forcibly. If the half-compelled posture is not in the range in which the seat occupant can move his or her back comfortably, the seat occupant is after all forced to take an unacceptable position. Thus, to create a less stressful sitting position for the seat occupant, it is preferred to change the posture of the seat occupant so as to correct his or her position in view of the range in which the seat occupant can move his or her back comfortably.

The present invention provides a vehicle seat which can determine a seat shape that is unlikely to put a stress on the seat occupant using the information that is provided by the seat occupant's unique sitting position as a factor for determination in determining the seat shape.

A vehicle seat according to one aspect of the present invention includes: a seat back which has a backrest support surface for a seat occupant that is variable in shape; a plurality of air bags that are located behind a support surface portion of the seat back and change the shape of the support surface upon introduction or discharge of air thereinto or therefrom; and a control device that is configured to control the introduction and discharge of air into and from the air bags. The control device introduces air into each of the plurality of air bags to set each air bag to a prescribed air bag state before the seat occupant sits on the vehicle seat and controls the introduction and discharge of air into and from each air bag based on the state of change in the air in each air bag that occurs when the seat occupant sits on the vehicle seat with the air bags in the set state to change the shape of the backrest support surface to a shape that conforms to the seat occupant's unique sitting position.

According to the above aspect, the control device introduces air into each of the plurality of air bags to set each air bag to a prescribed air bag state before the seat occupant sits on the vehicle seat. The control device also controls the introduction and discharge of air into and from each air bag based on the state of change in the air in each air bag that occurs when the seat occupant sits on the vehicle seat with the air bags in the set state to change the shape of the backrest support surface to a shape that conforms to the seat occupant's unique sitting position. Thus, information that is provided by the seat occupant's unique sitting position can be used as a factor for determination in determining the seat shape, and a backrest support surface shape which allows the seat occupant to feel less stress can be created.

In the above aspect, the state of change in the air in each air bag that occurs when the seat occupant sits on the vehicle seat may be the state of change in the internal pressure of each air bag.

According to the above configuration, because the amounts of change in the internal pressures of the air bags are used as factors for determination, there is no need to provide additional position detection sensors that are used to measure the thicknesses of the air bags. Thus, the device configuration can be simplified, and the device can be produced relatively inexpensively.

In the above aspect, the plurality of air bags may include at least three air bags that are located behind a support surface portion of the seat back and arranged separately at height positions corresponding at least to the thorax, lumbar and pelvis of the seat occupant.

According to the above configuration, because three or more air bags are provided, the information that is provided by the sitting position can be analyzed with a higher degree of accuracy. In addition, the result of analysis can be reflected in the seat shape with a higher degree of accuracy. Further, because the air bags are arranged separately at height positions corresponding to the thorax, lumbar and pelvis of the seat occupant, the manner of supporting the area from the lumber region to the thoracic region can be changed with reference to the information about the pelvis to thorax of the seat occupant. As a result, the seat occupant can be supported more properly.

In the above aspect, the seat back may be configured to recline, and the control device may not only control the introduction and discharge of air into and from each air bag but also adjust the recliner angle to change the backrest support surface to a shape that conforms to the seat occupant's unique sitting position.

According to the above configuration, because adjustment of the thicknesses of the air bags is used in conjunction with the adjustment of the recliner angle when the positions at which the seat occupant is supported are changed, the amount of change in shape that is required of each air bag can be reduced compared to the case where the positions at which the seat occupant is supported are changed only by adjusting the thicknesses of the air bags. Thus, the sitting position of the seat occupant can be adjusted without applying an excessive pressure to the air bags.

In the above aspect, the control device may introduce air into each of the plurality of air bags to set each air bag to a prescribed air bag state when any door of the vehicle is opened. Alternatively, the control device may introduce air into each of the plurality of air bags to set each air bag to a prescribed air bag state when the approach of a person with the car key is detected or when the contact of a person with the car key with a doorknob is detected.

The above aspect make it possible to determine a seat shape that is unlikely to put a stress on the seat occupant using the information that is provided by each seat occupant's unique sitting position as a factor for determination in determining the seat shape.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
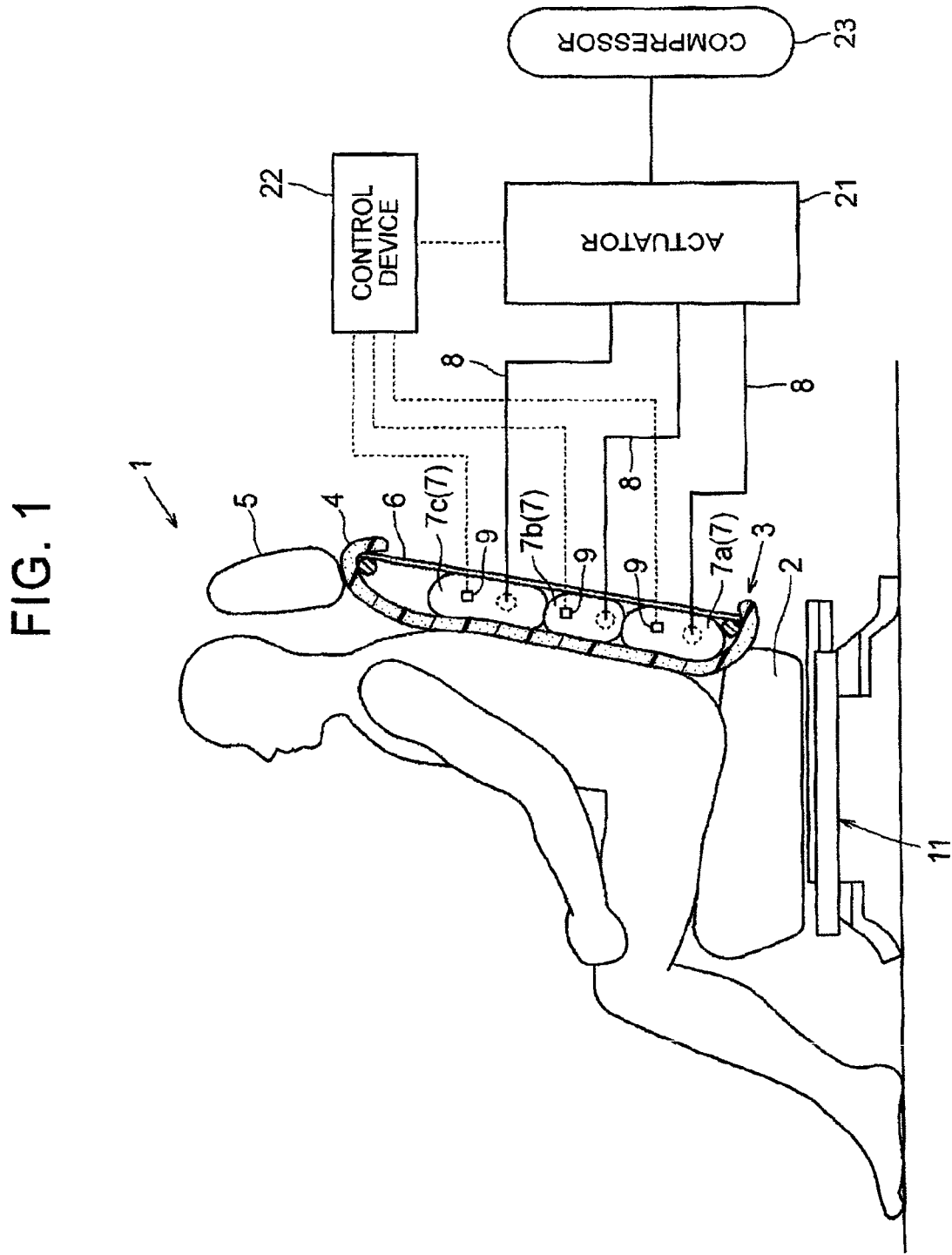
FIG. 1 is a side view of a vehicle seat according to an embodiment to which the present invention is applied.

Description is hereinafter made of an embodiment to implement the present invention with reference to the drawings. It should be noted that the directions, such as vertical direction, front-back direction and lateral direction, in this description indicate the directions as viewed by a seat occupant in a sitting position. FIG. 1 illustrates a vehicle seat 1 according to an embodiment to which the present invention is applied. The vehicle seat 1 includes a seat cushion 2 on which a seat occupant sits, a seat back 3 which serves as a backrest for the seat occupant, and a head rest 5 that supports the head of the seat occupant. In this embodiment, three air bags 7 are arranged in parallel in the vertical direction between a support spring 6 that extends between seat frames and a seat pad 4 as shown in FIG. 1. More specifically, the positions of the air bags 7 in the height direction approximately corresponding to the positions of the pelvis, lumbar and thorax of a seat occupant who has an average body shape. The air bags 7 are placed to extend laterally at the height positions. Each air bag 7 has an air hatch so that air can be separately introduced and discharged into and from the air bags 7. The air that is introduced into the air bags 7 is compressed air, and the each air bag 7 is connected to an air passage 8 through which the compressed air flows. The air passages 8 are connected to an actuator 21, and is also connected to a compressor 23 that is located upstream of the actuator 21. The actuator 21 has an electromagnetic valve which can choose whether or not to feed compressed air that is generated by the compressor 23 to the downstream side (air bags 7 side), and is also configured to have a function of reducing the pressure of the compressed air that is fed to the downstream side (air bags 7 side) to a specific pressure. The actuator 21 is connected to a control device 22, and the control device 22 can control the operation of the actuator 21. Each air bag 7 is provided with a pressure sensor 9 that can detect the internal pressure thereof. The detection results that are detected by the pressure sensors 9 are transmitted to the control device 22, and the control device 22 is programmed to be able to determine the details of control based on the detection results.

Figure 2:
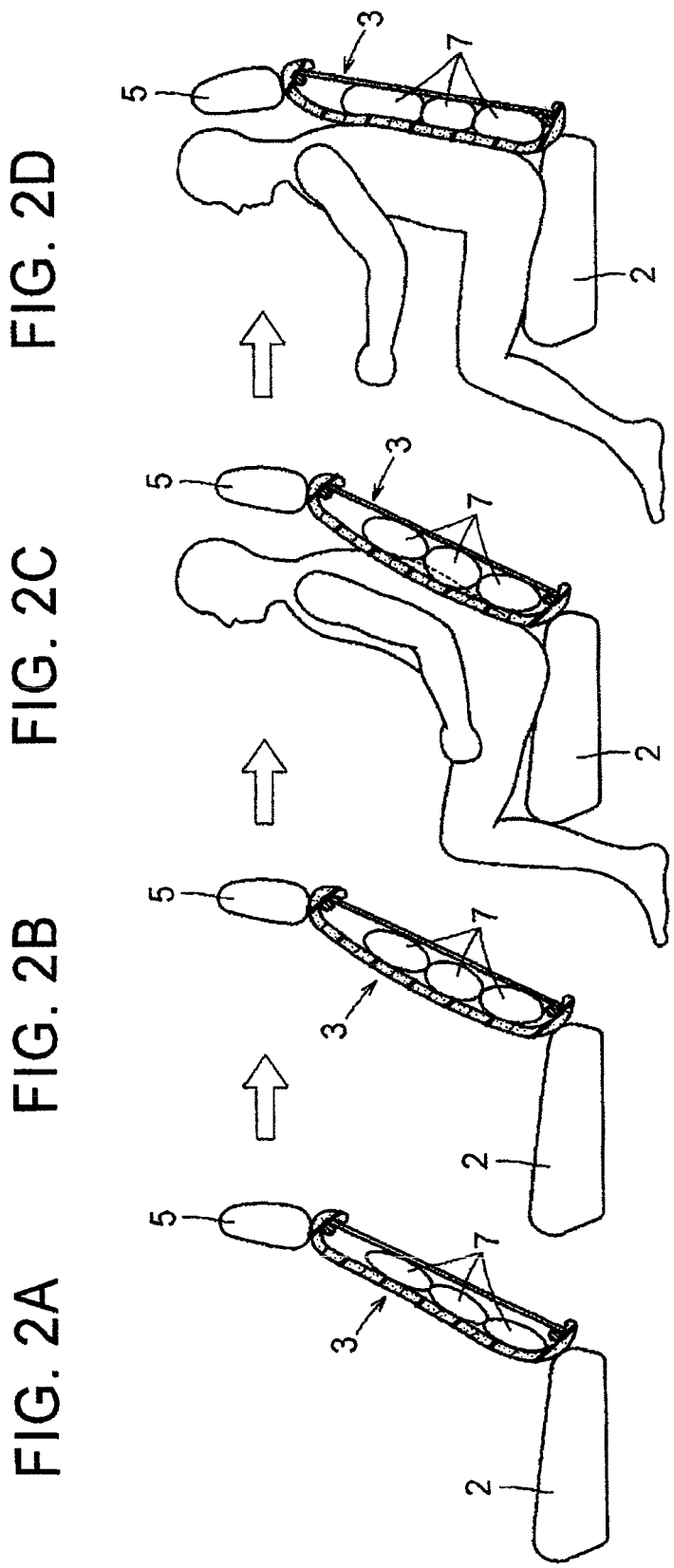
FIG. 2A-2D is a diagram that illustrates how the state of air bags changes when they are inflated.
Figure 3:
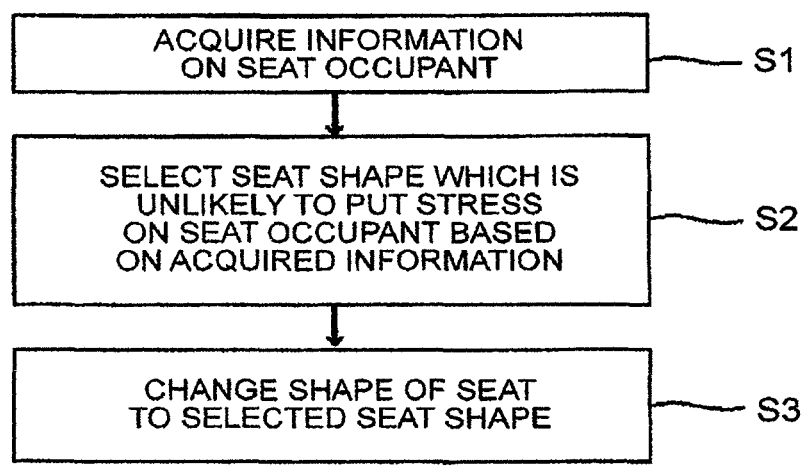
FIG. 3 is a flowchart that shows the outline of the present invention.
Figure 4:
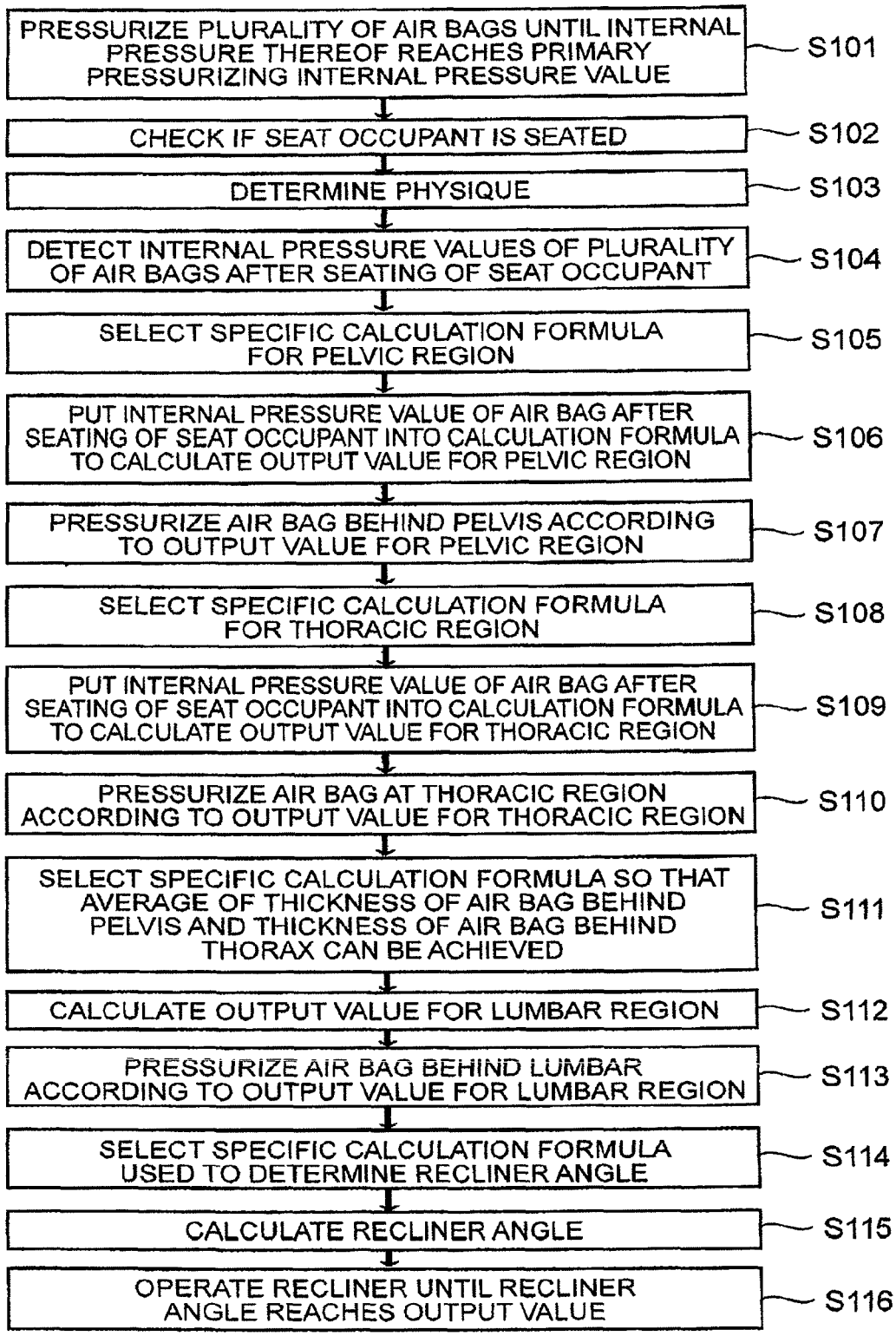
FIG. 4 is a flowchart that shows a method for acquiring information on characteristics of each individual and the process of creating a specific seat shape by inputting the information into a control device.

The overall procedure to control the sitting position is described briefly. As shown in FIG. 3, information that each seat occupant provides to the seat I is acquired (S1). The acquired information is input into a CPU, which is the control device 22. Statistics have been collected in advance on information that various seat occupants provide to seat 1 and the characteristics of the body of each seat occupant, such as physique and firmness of the body, and the information is compared to the statistical results to determine a shape of the backrest support surface on which the seat occupant who provides the information can take the least stressful position (S2). Then, the seat 1 is adjusted so that the backrest support surface can have the determined shape (S3). As a result, a state where the seat occupant is unlikely to feel stress is created. FIG. 2 shows how the state of the seat 1 is changed in realizing what is shown in FIG. 3. The state that is shown in FIG. 2A is an initial state where nothing has been done to the seat 1. From the initial state, a plurality of air bags 7 that are disposed behind a backrest support surface portion are inflated (FIG. 2B). A user sits on the seat 1 with the air bags 7 inflated (FIG. 2C). When the user sits on the seat 1, the state of each air bag 7 is changed. The change in the state of each air bag 7 is acquired as the information, and the shape of the backrest support surface is determined based on the information. Then, each mechanism of the seat 1 is operated so that the support surface can have the determined shape. The state that is shown in FIG. 20 is the state where the seat occupant is supported by the backrest with the determined support surface shape The method for acquiring information that each seat occupant provides to the seat 1 and the process of creating a specific seat shape by inputting the information into the control device 22 in this embodiment are as shown in FIG. 4. In the following, the contents of FIG. 4 are described with reference to a specific example. It should be noted that the goal of this embodiment is to enable the seat back 3 to support areas around the pelvis and thorax of the seat occupant who is seated on a front seat, such as the driver's seat, at appropriate positions so that the seat occupant can take a less stressful position.

First, in order to acquire the information on characteristics of each individual, the plurality of air bags 7 are pressurized until the internal pressure of the air bags reaches a primary pressurizing internal pressure value as shown in FIG. 4 (S101). At this time, the control device 22 commands the actuator 21 to apply a relatively low primary pressure to all of the three air bags 7. In this embodiment, the control device 22 commands the actuator 21 to apply the primary pressure to the air bags 7 when any door of the vehicle is opened. Upon receiving the command, the actuator 21 reduces the pressure of the compressed air that has been pressurized by the compressor 23 so that compressed air with a required pressure can be introduced into the air bags 7, and opens the electromagnetic valve to introduce compressed air with a specific pressure into the air bags 7. When the pressure sensors 9, which can measure the internal pressures of their corresponding air bags 7, indicate a specific reading, the control device 22 commands the actuator 21 to close the electromagnetic valve. When the electromagnetic valve is closed, air communication between the actuator 21 and the air bags 7 is terminated. On the seat 1 in this state, the seat occupant sits. When the seat occupant sits on the seat 1, the internal pressures of the air bags 7 increase because a pressurizing force is applied to the air bags 7 from outside.

It is checked if a seat occupant is seated or not so that the subsequent control cannot be erroneous (S102). In this embodiment, it is determined that a seat occupant is seated when all of the three air bags 7 are determined to have been pressurized to a specific value.

When a seat occupant sits on a front seat, a slide rail 11 is usually used to adjust the position of the seat 1 in the front-back direction. In this embodiment, the physique (height and/or weight that is estimated from the height) of the seat occupant is determined based on the position to which the slide rail 11 is adjusted (S103). This determination is made by comparison with data that have been amassed about the relationship between the height (or weight that is estimated from the height) of each seat occupant and the position to which the slide rail 11 is adjusted. The information on the position to which the slide rail 11 is adjusted or the information on the determination result is taken into the control device 22 so that it can be used as one factor in selecting a control method.

Then, the internal pressure values of the plurality of air bags after the seating of the seat occupant are detected (S104). As described above, because the seat occupant sits on the seat 1 with the air bags 7 pressurized to a primary pressure, the internal pressures of the air bags 7 are changed. The three air bags 7 are independent from each other, and it therefore depends on the sitting position what kind of external force is applied to each of the three air bags 7. Because the sitting position depends on the firmness of the body and so on, a seat shape that reflects the differences in, for example, firmness of the body, among individuals, can be selected by reflecting the differences between the internal pressures of the air bags 7 in the details of control. In this respect, the differences in the sitting position among individuals cannot be reflected simply by determining the internal pressure of each air bag 7. The most significant feature of the present invention is that differences in, for example, firmness of the body, among individuals can be reflected.

Then, specific calculation formulae are selected based on the physique of the seat occupant. The data that are obtained from the air bags are put into the calculation formulae as input values, and the results of the calculations are output (S105 to S116). A position that does not put stress on the seat occupant has been dynamically analyzed in advance from positions that the seat occupant tends to take, and a seat shape is selected to create a state in which the seat occupant does not feel stress based on the analysis result. In this way, a seat shape that allows the seat occupant to feel less stress can be selected. It should be noted that in the dynamic analysis of this embodiment, analysis is made so that the seat occupant can take a position in which the center of gravity of his or her head is supported with minimal stress on his or her neck.

Details of the data that are obtained from the air bags and calculation formulae that are used to obtain the output values are described below. In this embodiment, attention is focused on the internal pressures of the air bags 7, specifically, the air bags 7 which are located behind the pelvis, lumbar and thorax of the seat occupant, in order to determine what position the seat occupant tends to take. First, an internal pressure difference, which is the difference between the internal pressure after the application of the primary pressure to the air bags 7 and the internal pressure after the seating of the seat occupant, is obtained for each air bag 7. Then, the internal pressure differences of the air bags 7 are compared to each other. For example, the internal pressure difference of the air bag 7 that is located at the center of the three air bags 7 (air bag 7 that is located around the lumbar of a seat occupant with an average body shape, which is hereinafter referred to as "air bag 7b behind the lumbar") and the internal pressure difference of the air bag 7 that is located at the bottom of the three air bags 7 (air bag 7 that is located around the pelvis of a seat occupant with an average body shape, which is hereinafter referred to as "air bag 7a behind the pelvis") are compared as indicated by Equation 1 below.

[Equation 1]

$$J=(P_P-P_{P0})/(P_L-P_{L0}) \qquad \text{(Equation 1)}$$

wherein $P_P$: the internal pressure of the air bag 7a behind the pelvis after the seating of the seat occupant, $P_{P0}$: the internal pressure of the air bag 7a behind the pelvis after the application of the primary pressure, $P_L$: the internal pressure of the air bag 7b behind the lumbar after the seating of the seat occupant and $P_{L0}$: the internal pressure of the air bag 7b behind the lumbar after the application of the primary pressure.

The numerical value that is obtained from Equation 1 is compared with data that have been amassed in advance (data that show the internal pressure differences that an air bag 7 has when a seat occupant with a specific body shape and firmness is seated and data on the seat shape on which a seat occupant with a specific body shape can sit comfortably) to determine how much thickness the air bag 7a behind the pelvis should have. It is known that when a specific internal pressure is applied to an air bag 7 in a free state, the air bag 7 is inflated to a specific thickness. Thus, an air bag 7 can be inflated to a specific thickness by applying a specific internal pressure thereto. Thus, in this embodiment, the internal pressure of each air bag 7 is determined so that each air bag 7 can have a specific thickness. For easy comparison of the data that are obtained from Equation 1 with the amassed data, a calculation formula (such as Equation 2) has been established based on amassed data. The numerical value that is obtained from Equation 1 is put into Equation 2 to determine a set value for the internal pressure of the air bag 7. Because it is preferred to set the internal pressure of an air bag 7 with the pressure that is applied by the seat occupant also taken into account, the information on the physique of the seat occupant is also preferably taken into account when the calculation formulae are set. Because the degree to which an air bag 7 is inflated is also associated with the angle to which the recliner, which is described later, is adjusted, the calculation formulae should take the angle to which the recliner is adjusted into account.

[Equation 2]

$$P_{POUTPUT}=a \times J+b \qquad \text{(Equation 2)}$$

wherein $P_{POUTPUT}$: the internal pressure that should be applied to the air bag 7a behind the pelvis (when the value on the right side is equal to or greater than a specific upper limit value, the upper limit value is adopted and, when the value on the right side is equal to or smaller than a specific lower limit value, the lower limit value is adopted), a: a constant that is determined by the physique of the seat occupant, J: the value that is obtained from Equation 1, and b: a constant that is determined by the physique of the seat occupant.

Equations 1 and 2 are selected (S105), and the internal pressures of the air bags after the seating of the seat occupant are input into the selected calculation formulae. As a result, the $P_{POUTPUT}$ in Equation 2 (the internal pressure that should be applied to the air bag 7a behind the pelvis) is determined (S106), and thus the pressure is applied to the air bag 7a behind the pelvis (S107). When the determined pressure requirement is fulfilled, the actuator 21 is operated to stop the introduction or discharge of air into or from the air bag.

Next, as indicated by Equation 3 below, the internal pressure difference of the air bag 7b behind the lumbar and the internal pressure difference of the air bag 7 that is located at the top of the three air bags 7 (air bag 7 that is located around the thorax of a seat occupant with an average body shape, which is hereinafter referred to as air bag 7c behind the thorax) are compared, for example.

[Equation 3]

$$K=(P_{CH}-P_{CH0})/(P_L-P_{L0}) \quad \text{(Equation 3)}$$

wherein $P_{CH}$: the internal pressure of the air bag 7c behind the thorax after the seating of the seat occupant, $P_{CH0}$: the internal pressure of the air bag 7c behind the thorax after the application of the primary pressure, $P_L$: the internal pressure of the air bag 7b behind the lumbar after the seating of the seat occupant, and $P_{L0}$: the internal pressure of the air bag 7b behind the lumbar after the application of the primary pressure.

The numerical value that is obtained from the above equation is compared with data that have been amassed in advance to determine how much thickness the air bag 7c behind the thorax should have. The pressure in the air bag 7 is controlled to the pressure that is obtained from Equation 4 below, for example, so that the air bag 7c behind the thorax can have the determined thickness. The other points are the same as those that have been discussed above, and description thereof is therefore omitted.

[Equation 4]

$$P_{CHOUTPUT}=c \times K+d \quad \text{(Equation 4)}$$

wherein $P_{CHOUTPUT}$: the internal pressure that should be applied to the air bag 7c behind the thorax (when the value on the right side is equal to or greater than a specific upper limit value, the upper limit value is adopted and, when the value on the right side is equal to or smaller than a specific lower limit value, the lower limit value is adopted), c: a constant that is determined by the physique of the seat occupant, K: the value that is obtained from Equation 3, and d: a constant that is determined by the physique of the seat occupant.

Equations 3 and 4 are selected (S108), and the internal pressures of the air bags after the seating of the seat occupant are input into the selected calculation formulae. As a result, the $P_{CHOUTPUT}$ in Equation 4 (the internal pressure that should be applied to the air bag 7c behind the thorax) is determined (S109), and thus the pressure is applied to the air bag 7c behind the thorax (S110). When the pressure requirement that is determined in the above process is fulfilled, the actuator 21 is operated to stop the introduction or discharge of air into or from the air bag.

Next, a calculation formula for use in determining the thickness of the air bag 7b behind the lumbar is selected (S111), and an output value is calculated using the calculation formula (S112). Then, the air bag 7b behind the lumbar is pressurized based on the obtained output value (S113).

The thickness of the air bag 7b behind the lumbar is determined to be generally equal to the average of the thickness of the air bag 7a behind the pelvis and the thickness of the air bag 7c behind the thorax. By setting the air bag 7b behind the lumbar to have the thickness, it is possible to avoid an uncomfortable feeling that occurs when only the air bag 7b behind the lumbar is protruded or recessed too much.

For example, only the air bag 7c behind the thorax and the air bag 7a behind the pelvis may be inflated without introducing air into the air bag 7b behind the lumbar. Even in this state, the purpose of taking the sitting position into account can be accomplished because the thorax and pelvis are supported at specific positions. However, when seating feeling is taken into account in addition to the sitting position, it is preferred that the air bag 7b behind the lumbar is also expanded to a proper degree. This is because the seat occupant can feel which parts of the body are supported and the seating feeling worsens when the seat occupant finds that only the lumbar is not supported sufficiently. Because the air bag 7b behind the lumbar is inflated to prevent the seating feeling from worsening as described above, the air bag 7b behind the lumbar is preferably inflated to such a degree that it can connect smoothly to the air bag 7c behind the thorax and the air bag 7a behind the pelvis and in a range that does not affect the sitting position. In this way, the seating feeling can be satisfied with the sitting position maintained properly.

The setting of the angle of the recliner is next described. In this embodiment, the angle of the recliner is also changed in order to lead the position of the seat occupant to a specific state. The angle of the recliner is determined in balance with the thicknesses to which the air bags 7 are inflated based on amassed data, and is established as a formula, such as equation 5 below, which uses the numerical values that are obtained from Equations 1 and 3 as variables. The inclination of the body of the seat occupant could be changed only by changing the inflation state of the air bags 7 without changing the angle of the recliner in contrast to this embodiment. However, when the inclination is adjusted only by means of the air bags 7, air bags 7 which can be expanded significantly must be used. On the other hand, when expanding the air bags 7 is used in conjunction with changing the angle of the recliner, the inclination of the body of the seat occupant can be properly changed even when air bags 7 that cannot be inflated significantly are used. In addition, the air bags 7 can be prevented from being exposed to an excessive pressure.

[Equation 5]

$$\theta R=\theta T+e \times J+f \times K+g \quad \text{(Equation 5)}$$

wherein $\theta OR$: the output value for the recliner angle, $\theta T$: the angle of the recliner in an initial state, e: a constant that is determined by the physique of the seat occupant, J: the value that is obtained from Equation 1, f: a constant that is determined by the physique of the seat occupant, K: the value that is obtained from Equation 3, and g: a constant that is determined by the physique of the seat occupant.

Equation 5 is selected (S114), and the internal pressures of the air bags after the seating of the seat occupant are input into the selected calculation formula. As a result, the $\theta R$ in Equation 5 (the output value for the recliner angle) (S115) is determined, and thus the recliner is adjusted to the recliner angle (S116). When the determined angle requirement is fulfilled, the recliner is fixed to prevent it from moving.

According to a set of procedures as described above, because information that is provided by the seat occupant's unique sitting position is used to determine the shape of the backrest support surface of the seat back 3, a seat shape (shape of the backrest support surface) which is unlikely to put stress on the seat occupant can be determined.

While the numerical values that are obtained from Equations 1 and 3 are compared with data amassed in advance to determine how the areas around the pelvis and thorax of the seat occupant should be supported to support the seat occupant in the above embodiment, the numerical values that are obtained from Equations 1 and 3 do not necessarily have to be used as factors for determination.

While one embodiment has been described in the foregoing, the present invention can be implemented in many different modes in addition to the above embodiment. For example, the cushion length may be also changed or a side support may be also moved based on the detected information on the physique of the seat occupant. The determination of the physique of the seat occupant may be made not using the slide position of the seat but by detecting the weight of the seat occupant with, for example, a strain sensor that is provided under the cushion. Alternatively, the physique of the seat occupant may be determined by detecting the surface area of the seat back with which the back of the seat occupant is in contact when the seat occupant is seated with an electrostatic sensor that is placed in the seat back. Moreover, the above methods may be used in combination to determine the physique of the seat occupant. The number of the air bags is not necessarily limited to three, and may be more than three or may be two. When more than three air bags are provided, the seat can be adjusted more accurately in accordance with the physique of the seat occupant by determining which air bags correspond in position to the pelvis, lumbar and thorax and adjusting the air bags based on the determination. The air bags are not necessarily provided separately, and a plurality of air bags may be attached to one sheet. Even in this case, however, it is necessary that air can be separately introduced or discharged into or from each air bag. The recliner may be adjusted before the air bags are inflated, or the air bags may be inflated simultaneously with the adjustment of the recliner. The seat occupant may input the information on his or her physique by himself or herself. The input may be made through the use of buttons or by voice input. The primary pressure may be applied to the air bags not when a door of the vehicle is opened but when a certain condition which occurs before the seat occupant is sits on the vehicle seat is fulfilled, such as when the approach of a person with the car key is detected or when the contact with a doorknob is detected. The control device that controls the seat may be provided exclusively for the seat, or a control device that is provided in the vehicle may be used to control the seat. The formulae that are used to calculate output values may not be linear equations as described above as long as the formulae can be used to achieve the purpose of selecting an appropriate seat shape using data that have been amassed in advance as factors. In addition, there is no need to derive output values from calculation formulae. It is also possible to make it possible to determine the shape of the backrest support surface by dividing the input conditions more specifically, such as by setting a specific value to be output when the input value is in a specific numerical value range. Instead of regulating the thicknesses of the air bags by controlling the internal pressures of the air bags, the thicknesses of the air bags may be regulated using a position detector so that the thicknesses of the air bags can be known. Regulating the thicknesses of the air bags by controlling the internal pressures has the advantage that the number of devices can be reduced because there is no need to install additional devices, such as the position detector, except the pressure sensors.

What is claimed is:

1. A vehicle seat comprising:
   a seat back which has a backrest support surface that is configured to be variable in shape to support a seat occupant;
   a plurality of air bags that are located behind a support surface portion of the seat back and change the shape of the backrest support surface upon introduction or discharge of air thereinto or therefrom; and
   a control device that is configured to control the introduction and discharge of air into and from the air bags,
   wherein the control device introduces air into each of the plurality of air bags to set each air bag to a prescribed air bag state before the seat occupant sits on the vehicle seat and controls the introduction and discharge of air into and from each air bag based on a state of change in the air in each air bag that occurs when the seat occupant sits on the vehicle seat with the air bags in the prescribed air bag state to change the shape of the backrest support surface to a shape that conforms to a unique sitting position of the seat occupant.

2. The vehicle seat according to claim 1, wherein the state of change in the air in each air bag that occurs when the seat occupant sits on the vehicle seat is a state of change in an internal pressure of each air bag.

3. The vehicle seat according to claim 1, wherein the plurality of air bags include at least three air bags that are located behind the support surface portion of the seat back and arranged separately at height positions corresponding at least to a thorax, a lumbar and a pelvis of the seat occupant.

4. The vehicle seat according to claim 1, wherein the seat back is configured to recline, and the control device adjusts a reclining angle of the seat back to change the backrest support surface to a shape that conforms to a unique sitting position of the seat occupant.

5. The vehicle seat according to claim 1, wherein the control device introduces air into each of the plurality of air bags to set each air bag to the prescribed air bag state when any door of the vehicle is opened.

6. The vehicle seat according to claim 1, wherein the control device introduces air into each of the plurality of air bags to set each air bag to the prescribed air bag state when an approaching car key is detected.

7. The vehicle seat according to claim 1, wherein the control device introduces air into each of the plurality of air bags to set each air bag to the prescribed air bag state when contact between a car key and a doorknob is detected.

8. The vehicle seat according to claim 1, wherein the control device controls the introduction and discharge of air into each of the plurality of air bags based on an angle of recline of the seat back.

9. The vehicle seat according to claim 3, wherein the control device independently controls the introduction and discharge of air into each of the plurality of air bags based on an internal pressure difference to at least each air bag of the plurality of air bags corresponding to the thorax, the lumbar and the pelvis of the seat occupant.

* * * * *